(12) United States Patent
Kent (10) Patent No.: US 8,221,050 B2
(45) Date of Patent: Jul. 17, 2012

(54) ROBOTIC ASSEMBLY PROVIDING LEVELING AND JOINT STRESS REDUCTION

(75) Inventor: Richard J. Kent, Newbury, NH (US)

(73) Assignee: Fabworx Solutions, Inc., Austin, TX (US)

( * ) Notice: Subject to any disclaimer, the term of this patent is extended or adjusted under 35 U.S.C. 154(b) by 466 days.

(21) Appl. No.: 12/075,001

(22) Filed: Mar. 7, 2008

(65) Prior Publication Data

US 2009/0226285 A1 Sep. 10, 2009

(51) Int. Cl.
*B25J 17/00* (2006.01)

(52) U.S. Cl. ............... 414/744.5; 74/490.01; 74/490.05; 403/116; 901/15; 901/28

(58) Field of Classification Search ............... 414/744.2, 414/744.5; 901/15, 28, 29; 74/490.01, 490.05, 74/490.06; 403/61, 116, 118
See application file for complete search history.

(56) References Cited

U.S. PATENT DOCUMENTS

| | | | |
|---|---|---|---|
| 4,584,045 A * | 4/1986 | Richards | 156/345.31 |
| 4,984,959 A * | 1/1991 | Kato | 414/744.3 |
| 6,382,902 B1 * | 5/2002 | Sugimura | 414/805 |
| 7,578,649 B2 * | 8/2009 | Caveney et al. | 414/744.5 |

* cited by examiner

*Primary Examiner* — Donald Underwood

(74) *Attorney, Agent, or Firm* — John A. Fortkort; Fortkort & Houston P.C.

(57) ABSTRACT

A robotic is provided which comprises a hub (203); (b) a first lower arm (209) comprising first (213) and second (215) lower arm segments and having a first set of upper arms (229, 231) attached thereto; and (c) a first adjusting means (241) for adjusting the height of the first lower arm segment with respect to the second lower arm segment.

25 Claims, 6 Drawing Sheets

ROBOTIC ASSEMBLY PROVIDING LEVELING AND JOINT STRESS REDUCTION

FIELD OF THE DISCLOSURE

The present disclosure relates generally to robots, and more particularly to adjustment mechanisms for leveling end effectors and robotic arms.

BACKGROUND OF THE DISCLOSURE

The use of robots is widespread in the semiconductor industry, due to their ability to process a large number of semiconductor wafers through many different processing technologies, and to perform repetitive tasks quickly and accurately. The use of robots is especially advantageous in portions of semiconductor fabrication lines where human handling of semiconductor wafers is inefficient or undesirable. For example, many semiconductor fabrication processes, such as etching, deposition, and passivation, occur in reaction chambers having sealed environments. The use of robots allows these environments to be carefully maintained in order to minimize the likelihood of contamination and to optimize processing conditions.

Many of the robots currently utilized in the semiconductor industry are equipped with an end effector (also known as a blade or carrier) which is attached to one or more robotic arms. These robots are commonly used to transport semiconductor wafers from a loading port into various processing ports within a multiple chamber reaction system. The robotic arms are then employed to retrieve the wafer from a particular port after the wafer has been processed. The wafer is then shuttled by the robotic arms to the next port for additional processing. When all processing within the reaction system is complete, the robotic arm returns the semiconductor wafer to the loading port, and the next wafer is placed into the system by the robotic arm for processing. Typically, a stack of several semiconductor wafers is handled in this manner during each process run.

SUMMARY OF THE DISCLOSURE

In one aspect, a robotic is provided which comprises (a) a hub; (b) a first lower arm comprising first and second lower arm segments and having a first set of upper arms attached thereto; and (c) a first adjusting means for adjusting the height of the first lower arm segment with respect to the second lower arm segment. The robot may further comprise a second lower arm, wherein said second lower arm comprises third and fourth lower arm segments and has a second set of upper arms attached thereto, and may also comprise a second adjusting means for adjusting the height of the fourth lower arm segment with respect to the third lower arm segment. The first and second adjusting means may comprise, for example, bolts or screws.

In some embodiments, a first radius is disposed between the first lower arm segment and said hub, wherein said the first lower arm segment is attached to the first radius by a first fastener, wherein said first lower arm segment is rotatable with respect to the first radius when the first fastener is in a loosened state, and wherein said the first lower arm segment is not rotatable with respect to the first radius when the first fastener is in a tightened state. The first lower arm segment is rotatable with respect to the first radius by an angle $\phi$ when the first fastener is in a loosened state. Preferably, $\phi$ is within the range of about ±15°, more preferably $|\phi|$ is within the range of about 5° to about 15°, and most preferably $|\phi|$ is within the range of about 5° to about 10°.

In another aspect, a robotic is provided which comprises (a) a hub; (b) a first lower arm comprising first and second lower arm segments and having first and second upper arms attached thereto; (c) a first fastener (which may be, for example, a screw or a bolt) adapted to adjust the height of the second lower arm segment with respect to the first lower arm segment; (d) a second lower arm comprising third and fourth lower arm segments and having third and fourth upper arms attached thereto; (e) a second fastener (which may be, for example, a screw or a bolt) adapted to adjust the height of the fourth lower arm segment with respect to the third lower arm segment; (f) a first wrist assembly attached to said first and third upper arms; and (g) a second wrist assembly attached to said second and fourth upper arms.

In some embodiments, a first radius is disposed between the first lower arm segment and the hub, wherein the first lower arm segment is attached to the radius by a third fastener, wherein the first lower arm segment is rotatable with respect to the first radius when the third fastener is in a loosened state, and wherein the first lower arm segment is not rotatable with respect to the first radius when the third fastener is in a tightened state. Preferably, the first lower arm segment is rotatable with respect to the first radius by an angle $\phi_1$ when the third fastener is in said loosened state. Preferably, $\phi_1$ is within the range of about ±15°, more preferably $\phi_1|$ is within the range of about 5° to about 15°, and most preferably $|\phi_1|$ is within the range of about 5° to about 10°.

In other embodiments, a second radius is disposed between the third lower arm segment and the hub, wherein the third lower arm segment is attached to the second radius by a fourth fastener, wherein the third lower arm segment is rotatable with respect to the second radius when the fourth fastener is in a loosened state, and wherein the third lower arm segment is not rotatable with respect to the second radius when the fourth fastener is in a tightened state. Preferably, the third lower arm segment is rotatable with respect to the second radius by an angle $\phi_2$ when the fourth fastener is in the loosened state, wherein $\phi_2$ is preferably within the range of about ±15°. More preferably, $|\phi_1|$ is within the range of about 5° to about 15°, and most preferably, $|\phi_1|$ is within the range of about 5° to about 15°.

In a further aspect, a robot is provided which comprises (a) a hub having a first rotatable ring disposed thereon; (b) a first radius attached to said first ring; and (c) a first arm repositionably attached to said first radius. The first arm is preferably repositionably attached or repositionably attachable to the first radius by way of a first fastener which is adapted to be loosened to permit an angular adjustment of the first arm from a first position to a second position with respect to the first radius, and which is preferably further adapted to be tightened to secure the first arm in the second position.

In some embodiments, the first fastener comprises a threaded fastener with an axial portion which extends through a slot provided in a wall of the first arm and into an aperture provided in the first radius. The slot is preferably sufficiently larger than the axial portion to permit the first arm to be rotatable with respect to the first radius by an angle $\phi_1$ when the first fastener is loosened but still inserted into the aperture provided in the first radius. Preferably, $\phi_1$ is within the range of about ±15°, more preferably, $|\phi_1|$ is within the range of about 10° to about 15°, and most preferably, $|\phi_1|$ is within the range of about 5° to about 10°.

In some embodiments, the robot further comprises a second rotatable ring disposed on the hub; and a second radius attached to the second ring; wherein the second arm is repositionably attached to the second radius by way of a second fastening means which is adapted to be loosened to permit an adjustment of the first arm from a third position to a fourth position with respect to the second radius (preferably the adjustment involves an angular rotation of the first arm across the surface of the first radius). The second fastening means is preferably further adapted to be tightened to secure the second arm in the fourth position. In some such embodiments, the second fastening means comprises a threaded fastener with an axial portion which extends through a slot provided in a wall of the second arm and into an aperture provided in the second radius, wherein the slot is sufficiently larger than the axial portion to permit the second arm to be rotatable with respect to the second radius by an angle $\phi_2$ when the second fastener is loosened but still inserted into the aperture provided in the second radius. Preferably, $\phi_2$ is within the range of about ±15°, more preferably, $|\phi_2|$ is within the range of about 10° to about 15°, and most preferably, $|\phi_2|$ is within the range of about 5° to about 10°.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION

Figure 1:
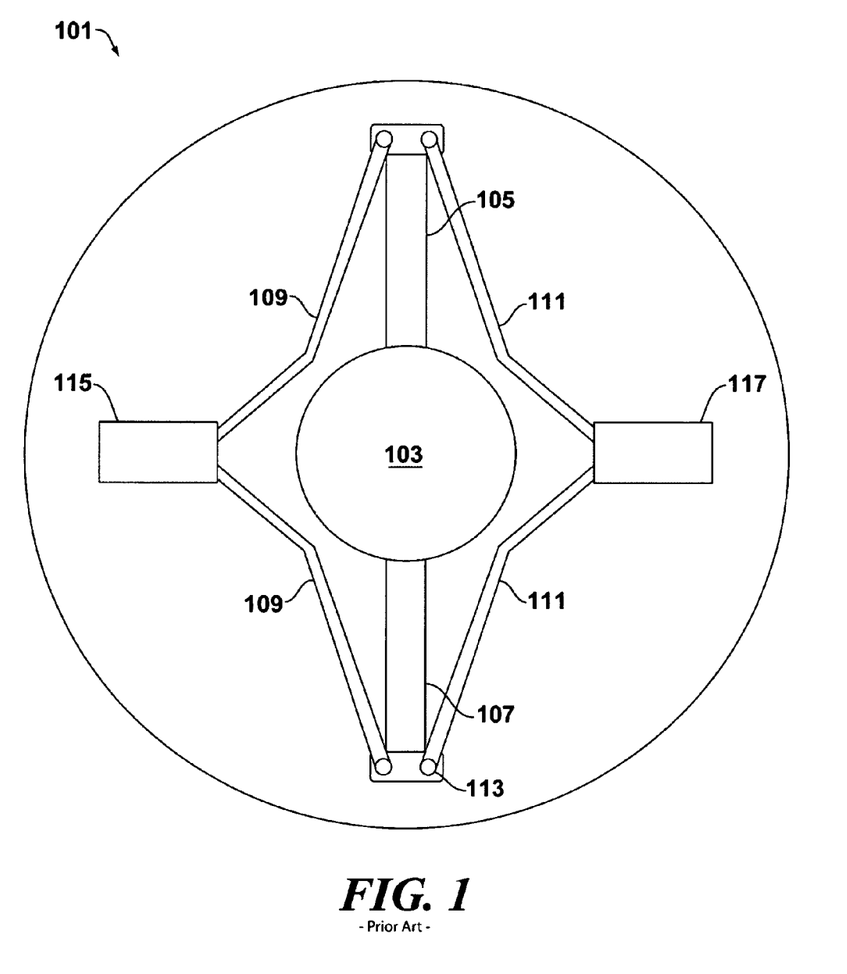
FIG. 1 is an illustration of a prior art robot.

Many different types of robots are utilized in the semiconductor industry. FIG. 1 depicts one such robot. Robots of this type are utilized, for example, in the ENDURA® and CENTURA® 200 nm/300 nm platforms sold by Applied Materials (Santa Clara, Calif.). The robot 101 includes a central hub 103 and two lower arms 105, 107. The lower arms 105, 107 are rotatingly attached to the hub 103 and are driven by servo drives housed within the hub 103.

First 109 and second 111 pairs of forearms are attached to the lower arms 105, 107 by way of elbow joints 113, and first 115 and second 117 wafer blades are attached to the first 109 and second 111 pairs of forearms, respectively, by way of wrist assemblies (not shown). The wafer blades 115, 117 are spaced 180° apart from each other and are adapted for handling semiconductor wafers and other objects utilized in semiconductor fabrication processes. The forearms 109, 111 of the robot can be extended or retracted by rotating the servo drives in opposite directions to each other, and can be rotated about the hub 103 (in the so-called theta direction) by rotating the servo drives in the same direction. The configuration of the arm assemblies (including lower arms 105 and 107, forearms 109 and 111, and wafer blades 115 and 117) in the robot 101 depicted in FIG. 1 is referred to in the art as a "frog-leg" design. Since the robot 101 shown therein has two such configurations, it is referred to as a "dual frog-leg" design.

While robots of the type depicted in FIG. 1 have many desirable attributes, they also suffer from some infirmities. One such infirmity relates to the configuration of the elbow joints 113 currently utilized in these robots. In particular, the robot 101 depicted in FIG. 1 includes four elbow joints 113. These elbow joints 113 are independently adjustable to attain the correct height and level of the wafer blades 115, 117 with respect to an axis (the so-called z-axis) which is perpendicular to the plane along which the robotic arm assemblies operate (this axis is also perpendicular to the major top surface of hub 103). The process of making adjustments to the attitude of the robot 101 via these elbow joints 113 is an inaccurate and time consuming process.

Moreover, such adjustments can place undue stress or strain upon the components of the robot, including the lower arms 105, 107 and forearms 109, 111, the wrist assemblies (not shown), the elbow joints 113, and the rotating rings (not shown) which are disposed upon or within the hub 103. Such stresses can reduce the average lifetime of the arm assembly. In some instances, the presence of friction may even cause these stresses to be stored as potential energy while the forearms 109, 111 of the robot 101 are being extended or retracted. This stored energy may be released suddenly and rapidly, thereby imparting a jerky motion to the arm assembly that can cause harmful contact between the robotic arm assembly and surrounding equipment. This motion can also change the position of a wafer disposed on the blades 115, 117, which can give rise to manufacturing defects. In some instances, this undesirable motion of the arm assemblies may even cause wafers to "hop" off of the wafer blades 115, 117. This can result in serious damage to the wafer and to the processing equipment, and may require significant downtime while clean-up and repairs are implemented.

It has also been found that, in robots of the type depicted in FIG. 1, the rings upon which the lower arms 105, 107 are mounted may deviate from optimal concentricity and perpendicularity. During use, these deviations can transfer to the robotic arm assemblies, thus causing second order stresses within the elbow joints 113, wrist assembly and hub 103. It will be appreciated that such deviations from concentricity and perpendicularity, and the foregoing problems arising from attitude adjustments and the associated stresses they can impart, will tend to be exacerbated at higher throughputs. Since the current trend in the semiconductor industry is toward higher throughputs, these problems pose significant challenges to the implementation of current process technologies.

It has now been found that the foregoing problems may be alleviated or eliminated through the provision of a leveling mechanism which allows accurate leveling of wafer blades in robots of the type depicted in FIG. 1, so that the two wafer blades may be maintained in the same horizontal plane at all times. It has further been found that the foregoing problems may be alleviated or eliminated through the provision of a robotic arm assembly which includes a lower arm segment and a radius, and wherein the lower arm segment is adapted to permit a slight angle of rotation of the lower arm segment about the radius.

In contrast to the design depicted in FIG. 1 in which the elbow joints are independently adjustable, robots may be made in accordance with the teachings herein in which the elbow joints are preferably machined to tight tolerances to each other, thus providing an accurate, stress free assembly. Height adjustment and leveling along the z-axis are preformed using the lower arm assembly, as described in greater detail below. In some embodiments, a secondary component may also be designed into one or more of the lower arms to provide stress free attachment to the magnetic rings of the hub.

Figure 2:
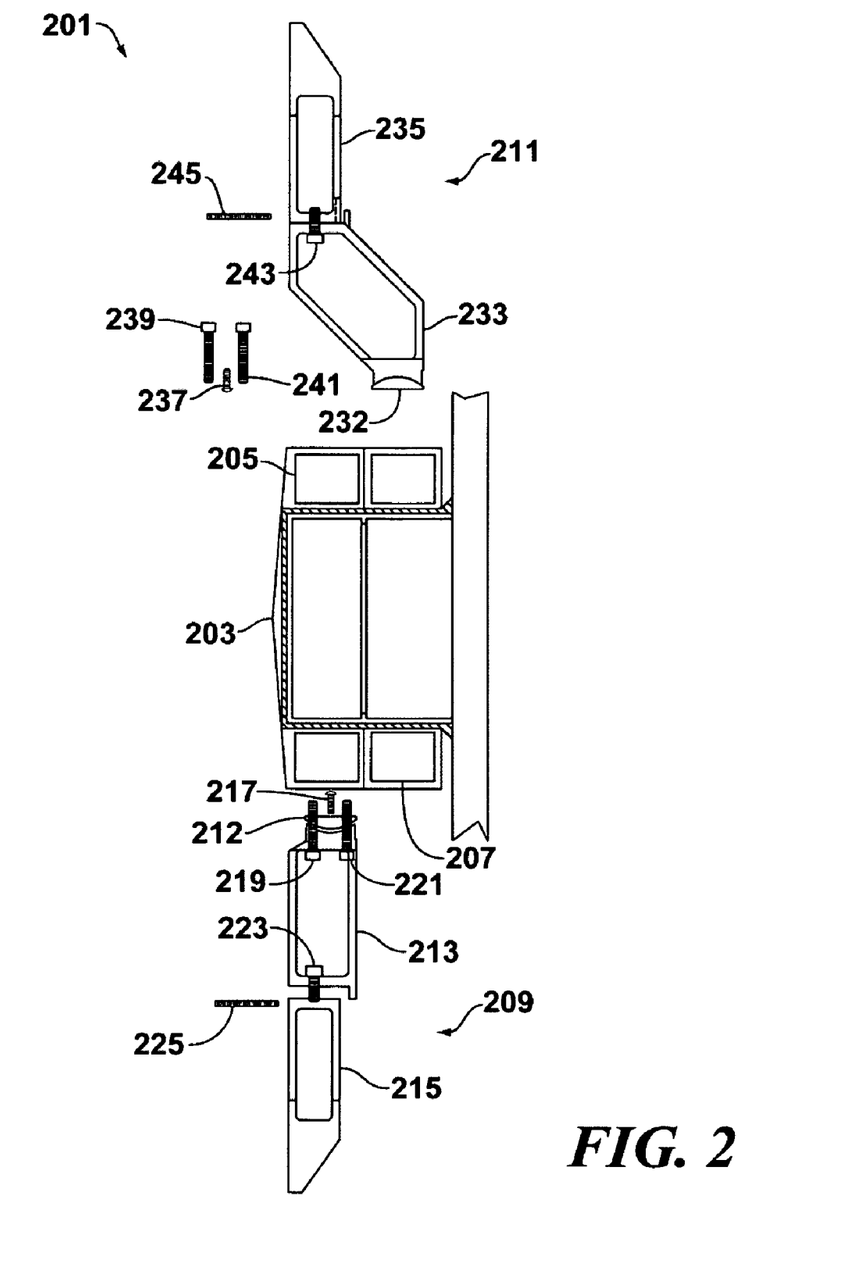
FIG. 2 is a cross-sectional view of one particular, non-limiting embodiment of a robot made in accordance with the teachings herein.
Figure 3:
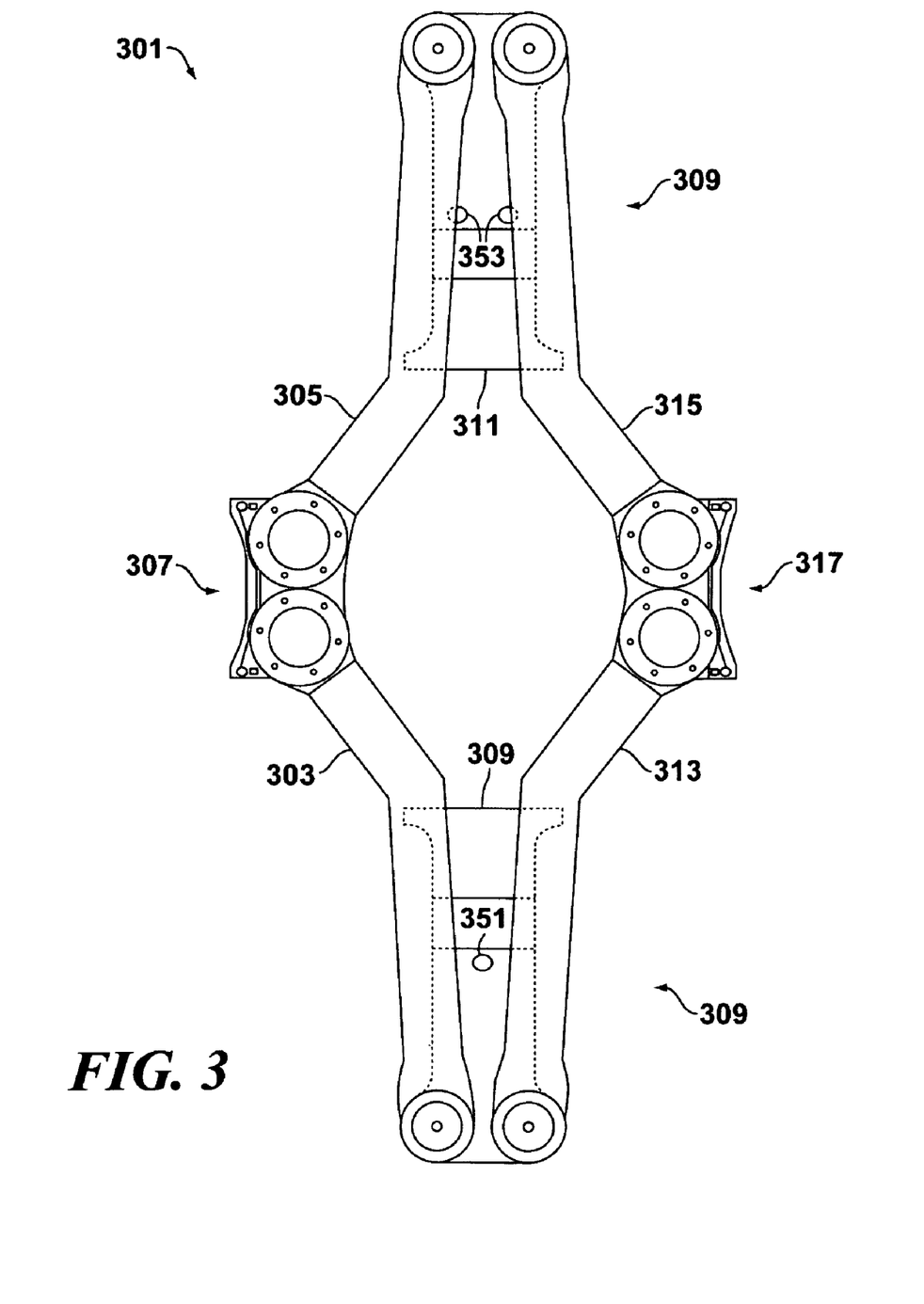
FIG. 3 is a top view of the arm assembly of the robot of FIG. 2.
Figure 4:
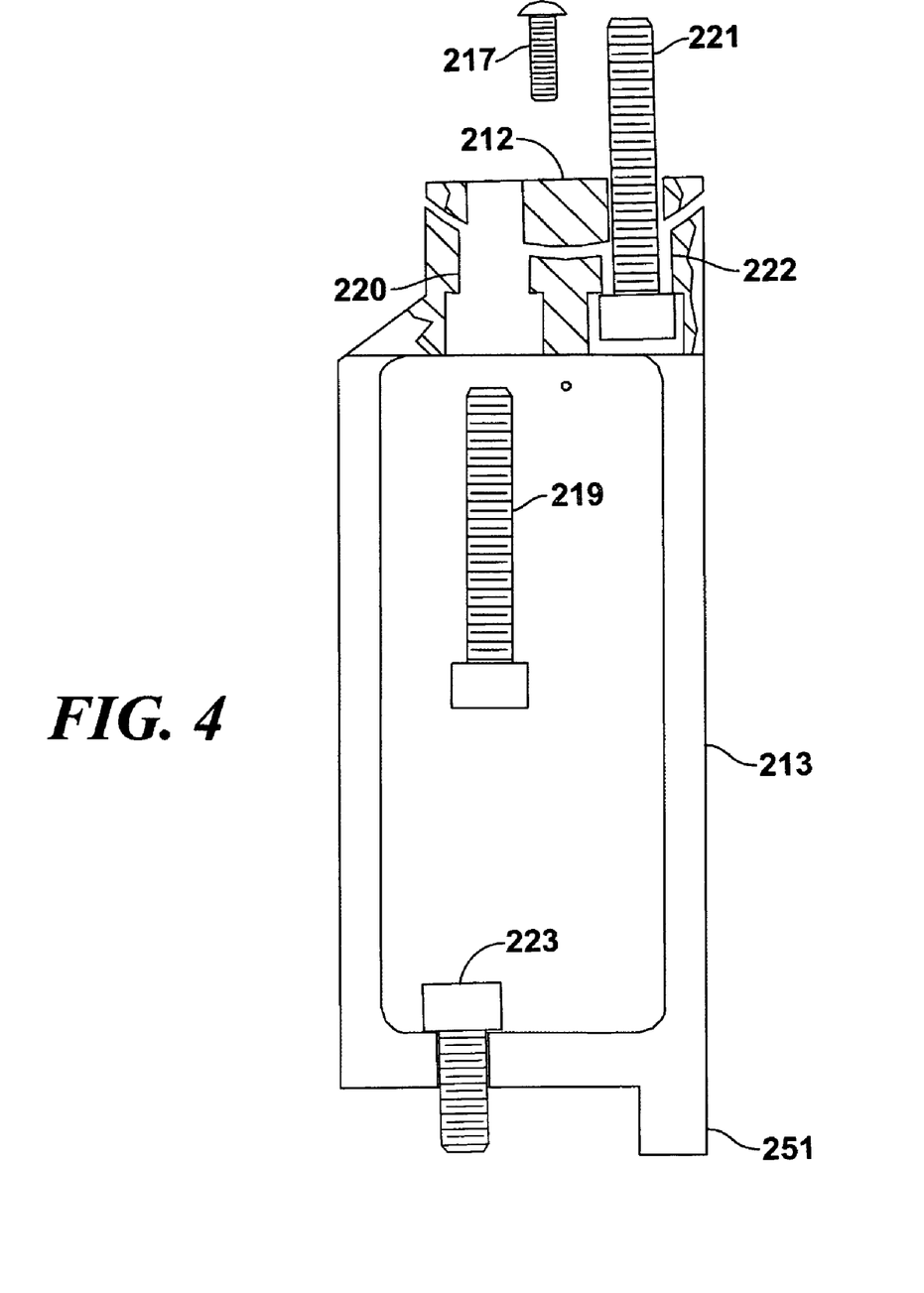
FIG. 4 is a magnified view of the first lower arm segment of the robotic arm of FIG. 2.

FIGS. 2-4 depict a first particular, non-limiting embodiment of a robot made in accordance with the teachings herein. The robot 201 depicted therein comprises a hub 203, a first radius 212 which is attached to a first rotating ring 205 or column in the hub 203, a second radius 232 which is attached to a second rotating ring 207 or column in the hub 203, and first 209 and second 211 lower arms. A first radius 212 is attached to the first rotating ring 205 by way of a fastener 217, and a second radius 232 is attached to the second rotating ring 207 by way of a fastener 237. Preferably, the fasteners 217 and 237 are threaded bolts or screws.

The first 209 lower arm comprises first 213 and second 215 lower arm segments. The first lower arm segment 213 is attached to the first radius 212 by way of fasteners 219 and 221 (which are preferably threaded bolts), and is attached to the second lower arm segment 215 by way of fastener 223 (which is also preferably a threaded bolt). Similarly, the second lower arm 211 comprises first 233 and second 235 lower arm segments. The first lower arm segment 233 is attached to the second radius 232 by way of fasteners 239 and 241 (which are preferably threaded bolts, and which are shown removed from the second radius 232 for greater clarity), and is attached to the second lower arm segment 235 by way of fastener 243 (which is also preferably a threaded bolt). The first lower arm segment 233 is of a slightly different geometry than first lower arm segment 213, due to the need to attain co-planarity of the second arm segments 215 and 235 and the relative vertical disposition of the rings 205 and 207 to which the first lower arm segments 213 and 233 are attached.

FIG. 3 shows the upper portion 301 of the robot depicted in FIG. 2. As seen therein, the upper portion 301 of the robot comprises a first pair of forearms 303, 305 which are attached on one end to wrist assembly 307, and which are respectively attached on the other end to second lower arm segments 215 and 235 (see FIG. 2) by way of respective plates 309 and 311. Similarly, a second pair of forearms 313, 315 are attached on one end to wrist assembly 317, and are respectively attached on the other end to second lower arm segments 215 and 235 (see FIG. 2) by way of respective plates 309 and 311. First and second wafer blades (not shown) are mounted on wrist assemblies 307 and 317, respectively. The details of the preferred construction of wrist assemblies 307 and 317 are shown in commonly assigned U.S. Ser. No. 10/919,070 (Kent), filed on Aug. 16, 2004, which is incorporated herein by reference in its entirety.

Figure 5:
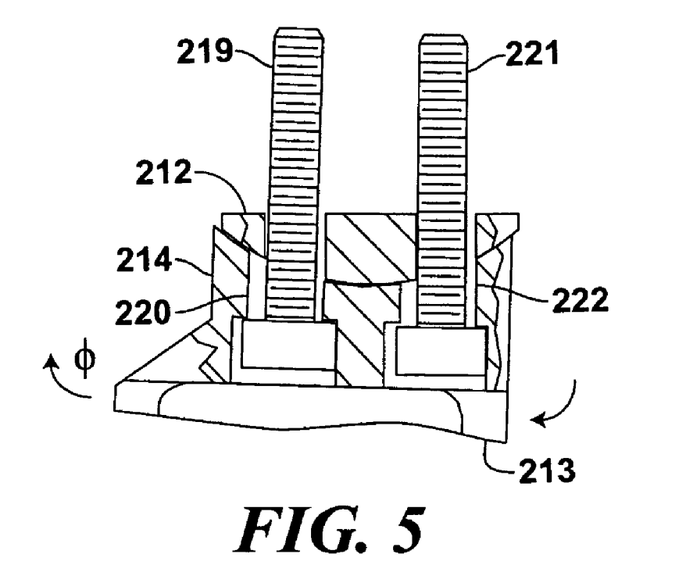
FIGS. 5-6 illustrate the means by which the lower arm segment of the robotic arm of FIG. 2 may be utilized to permit a slight angle of rotation of the lower arm segment with respect to the radius.
Figure 6:
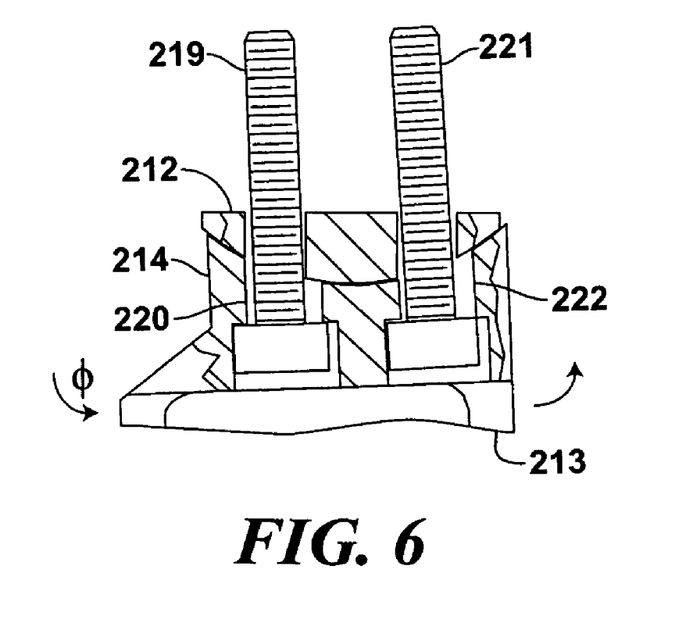
Figure 7:
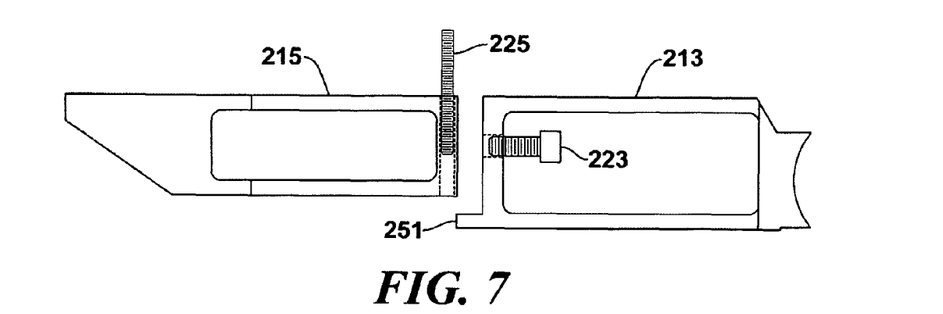
FIGS. 7-9 illustrate the use of a lower arm segment of the type described herein to achieve a Z-axis height adjustment.
Figure 8:
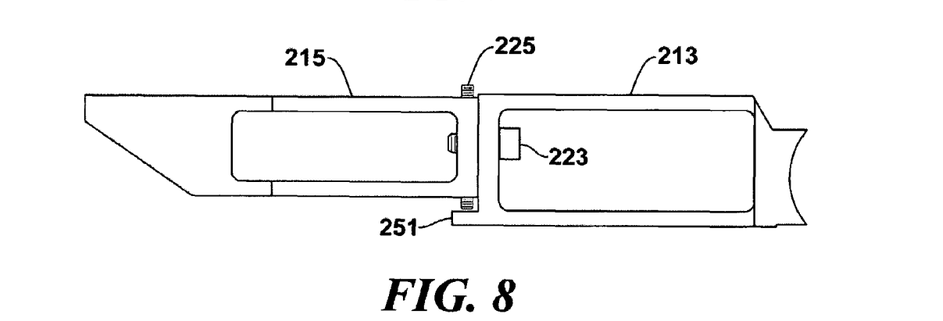
Figure 9:
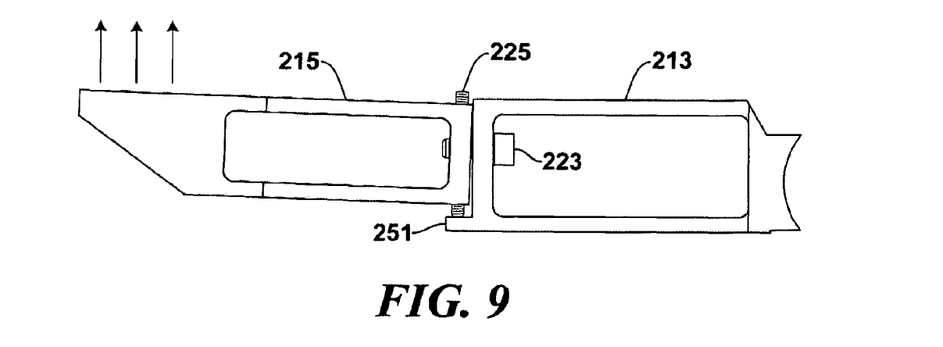

Referring now to FIGS. 4-6, one end 214 of the first lower arm segment 213 is preferably constructed with slots 220 and 222 whose diameters are slightly larger than the axial portion of respective fasteners 219 and 221. Such a construction permits a slight angle of rotation φ of the lower arm segment 213 with respect to radius 212 (and about the longitudinal axes of the fasteners 219 and 221) when the fasteners 219 and 221 are sufficiently loosened, after which the first lower arm segment may be fixed in the desired orientation by tightening the fasteners 219 and 221. The fasteners 219 and 221 may be adapted to engage either a threaded nut or a threaded aperture provided in the radius 212. Preferably, the second 233 lower arm segment is constructed in a similar manner so as to permit a slight angle of rotation therein with respect to radius 232 (and about the longitudinal axis of the threaded fasteners 239 and 241).

In some embodiments, the aforementioned angle of rotation φ about radius 212 or 232 is preferably within the range of about ±15°, more preferably within the range of about ±10°, and most preferably within the range of about ±5°, while in other embodiments, the aforementioned angle of rotation φ about radius 212 or 232 is preferably within the range of about ±15°, more preferably within the range of about 5° to about 15°, and most preferably within the range of about 5° to about 10°. It has been found that the provision of such an angle of rotation is sufficient to relieve the stress that might otherwise be placed on the wrist, elbow and hub assemblies from the elbow joints as noted above, while also compensating for slight deviations in the rings 205 and 207 which might prevent lower arms 213 and 233 from achieving perpendicularity with respect to the hub 203.

While the foregoing embodiment utilizes a construction which affords an angle of rotation φ and which is equipped with two fasteners (e.g., fasteners 219 and 221), it will be appreciated that embodiments are also possible in accordance with the teachings herein which provide an angle of rotation and which are equipped with a single fastener, or with more than two fasteners. Moreover, in some embodiments, such a construction may be utilized in either one of, or in both of, lower arm segments 213 and 233. It will further be appreciated that, in some embodiments, the slots 220 and 222 into which fasteners to 219 and 221, respectfully, extend may be extended along an axis of rotation perpendicular to fasteners 219 and 221 so as to permit an angle of rotation β of lower arm segment 213 about its longitudinal axis. In some embodiments, lower arm segment 233 may have a similar construction.

With reference to FIGS. 2 and 7-9, an adjustment mechanism in the form of a series of cap screws 225 and 245 is provided in each of the second lower arm segments 215 and 235. The cap screws 225 and 245 extend through apertures 351 and 353 of plates 309 and 311, respectively (see FIG. 3). As the cap screws 225 and 245 are tightened, they press against a lip 251 provided on one end of the abutting respective lower arm segments 213 or 233, thereby adjusting the respective forearms 229 and 231 upward (as indicated by the arrows) along the longitudinal axes of the cap screws 225 and 245. Preferably, the fasteners 223 and 243 (see FIG. 2) are loosened somewhat while the orientation of the robotic arm assembly is being modified, and are tightened once the proper orientation is attained.

In the preferred embodiment shown in FIGS. 2-9, one cap screw 225 is provided in the second lower arm segment 215, and two cap screws 245 are provided in the second lower arm segment 235. This arrangement provides a three point leveling mechanism which allows the heights of the wafer blades attached to the wrist assemblies 307 and 317 (see FIG. 3) to be adjusted while the relative horizontal plane of operation of the robotic arm assembly is maintained. Since the robotic arm assembly moves only in axial and radial directions with respect to the hub 203, this adjustment mechanism performs the critical function of allowing both wafer blades to be maintained in the same horizontal plane. Of course, one skilled in the art will appreciate, however, that a similar end may be achieved by, for example, utilizing more than three cap screws, or through the use of other fasteners or adjustment means as are known to the art.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A robot, comprising:
   a hub;
   a first lower arm comprising first and second lower arm segments, said first lower arm having a first set of upper arms attached thereto;
   a second lower arm; and
   a first adjusting means for adjusting the height of the second lower arm segment with respect to the first lower arm segment;
   wherein a first radius is disposed between said first lower arm segment and said hub, wherein said first lower arm segment is attached to said first radius by a first fastener, wherein said first lower arm segment is rotatable with respect to said first radius when said first fastener is in a loosened state, wherein said first lower arm segment is not rotatable with respect to said first radius when said first fastener is in a tightened state, wherein said first lower arm is equipped with a hole, and wherein said first fastener loosely engages said hole when it is in said loosened state.

2. The robot of claim 1, wherein said second lower arm comprises third and fourth lower arm segments and has a second set of upper arms attached thereto.

3. The robot of claim 1, further comprising:
   a second adjusting means for adjusting the height of the fourth lower arm segment with respect to the third lower arm segment.

4. The robot of claim 1, wherein said first set of upper arms comprises a plurality of upper arms.

5. The robot of claim 2, wherein said second set of upper arms also comprises a plurality of upper arms.

6. The robot of claim 1, wherein said first lower arm is rotatingly attached to said hub.

7. The robot of claim 1, wherein said first lower arm segment is rotatable with respect to said first radius by an angle $\phi$ when said first fastener is in a loosened state, and wherein $|\phi|$ is within the range of about ±15°.

8. The robot of claim 1, wherein said first lower arm segment is rotatable with respect to said first radius by an angle $\phi$ when said first fastener is in a loosened state, and wherein $|\phi|$ is within the range of about 5° to about 15°.

9. The robot of claim 1, wherein said first lower arm segment is rotatable with respect to said first radius by an angle $\phi$ when said first fastener is in a loosened state, and wherein $|\phi|$ is within the range of about 5° to about 10°.

10. The robot of claim 2, wherein one member of the first set of upper arms and one member of the second set of upper arms are joined together via a first wrist assembly.

11. The robot of claim 10, further comprising a first wafer blade, and wherein said first wafer blade is mounted to said first wrist assembly.

12. The robot of claim 10, wherein one member of the first set of upper arms and one member of the second set of upper arms are joined together via a second wrist assembly.

13. A robot, comprising:
    a hub;
    a first lower arm comprising first and second lower arm segments and having first and second upper arms attached thereto;
    a first fastener adapted to adjust the height of the second lower arm segment with respect to the first lower arm segment;
    a second lower arm comprising third and fourth lower arm segments and having third and fourth upper arms attached thereto;
    a second fastener adapted to adjust the height of the fourth lower arm segment with respect to the third lower arm segment;
    a first wrist assembly attached to said first and third upper arms; and
    a second wrist assembly attached to said second and fourth upper arms;
    wherein a first radius is disposed between said first lower arm segment and said hub, wherein said first lower arm segment is attached to said radius by a third fastener, wherein said first lower arm segment is rotatable with respect to said first radius when said third fastener is in a loosened state, wherein said first lower arm segment is not rotatable with respect to said first radius when said third fastener is in a tightened state, wherein said first lower arm is equipped with a hole, and wherein said first fastener loosely engages said hole when it is in a loosened state.

14. The robot of claim 13, further comprising first and second wafer blades attached, respectively, to said first and second wrist assemblies.

15. The robot of claim 13, wherein said first and third upper arms form a first robotic arm assembly having a frog-leg configuration.

16. The robot of claim 13, wherein said first and second robotic arms are rotatable about said hub.

17. The robot of claim 13, wherein said first lower arm segment is rotatable with respect to said first radius by an angle $\phi_1$ when said third fastener is in said loosened state, and wherein $\phi_1$ is within the range of about ±15°.

18. The robot of claim 17, wherein $|\phi_1|$ is within the range of about 5° to about 10°.

19. The robot of claim 13, wherein a second radius is disposed between said third lower arm segment and said hub, wherein said third lower arm segment is attached to said second radius by a fourth fastener, wherein said third lower arm segment is rotatable with respect to said second radius when said fourth fastener is in a loosened state, and wherein said third lower arm segment is not rotatable with respect to said second radius when said fourth fastener is in a tightened state.

20. The robot of claim 19, wherein said third lower arm segment is rotatable with respect to said second radius by an angle $\phi_2$ when said fourth fastener is in said loosened state, and wherein $\phi_2$ is within the range of about ±15°.

21. The robot of claim 20, wherein $|\phi_2|$ is within the range of about 5° to about 15°.

22. A robot, comprising:
    a hub having a first rotatable ring disposed thereon;
    a first radius attached to said first ring with a fastener; and
    a first arm repositionably attached to said first radius, wherein said first arm is equipped with a hole, wherein said fastener is adjustable from a loosened state to a tightened state, and wherein said fastener loosely engages said hole when it is in said loosened state.

23. The robot of claim 22, wherein said first arm is repositionably attached to said first radius by way of a first fastener which is adapted to be loosened to permit an adjustment of the first arm from a first position to a second position with respect to said first radius.

24. The robot of claim 1, wherein said first lower arm segment has a first longitudinal axis, wherein said second lower arm segment has a second longitudinal axis, and wherein said adjusting means adjusts the angle between said first and second longitudinal axes.

25. The robot of claim 24, wherein said adjusting means is a threaded fastener.

* * * * *